US012717528B2

(12) United States Patent
Kikumoto et al.

(10) Patent No.: US 12,717,528 B2
(45) Date of Patent: Aug. 25, 2026

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Takashi Kikumoto, Kanagawa (JP); Yoshie Ohira, Kanagawa (JP); Shogo Ishikawa, Kanagawa (JP); Kazuhiro Ohkawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/321,030

(22) Filed: May 22, 2023

(65) Prior Publication Data

US 2024/0152301 A1 May 9, 2024

(30) Foreign Application Priority Data

Nov. 8, 2022 (JP) ................................ 2022-178660

(51) Int. Cl.
*G06F 3/12* (2006.01)
*G06T 7/00* (2017.01)

(52) U.S. Cl.
CPC ............ *G06F 3/121* (2013.01); *G06F 3/1208* (2013.01); *G06F 3/1256* (2013.01); *G06T 7/0002* (2013.01); *G06T 2207/30176* (2013.01)

(58) Field of Classification Search
None
See application file for complete search history.

(56) References Cited

U.S. PATENT DOCUMENTS

| | | | | |
|---|---|---|---|---|
| 2003/0133721 | A1* | 7/2003 | Brewington | H04N 1/00029 399/19 |
| 2011/0179961 | A1* | 7/2011 | Yanagawa | G06F 3/1256 101/483 |
| 2022/0083294 | A1* | 3/2022 | Agehama | G06F 3/1252 |
| 2022/0299922 | A1* | 9/2022 | Mashiko | G06F 3/121 |
| 2023/0033817 | A1* | 2/2023 | Eda | G06F 3/1237 |
| 2023/0068383 | A1* | 3/2023 | Miyahara | G06F 3/1234 |
| 2023/0074128 | A1* | 3/2023 | Fujita | G06F 3/1285 |
| 2023/0082522 | A1* | 3/2023 | Kasahara | G03G 15/70 358/1.18 |
| 2023/0114012 | A1* | 4/2023 | Komazawa | H04N 1/00037 358/1.15 |
| 2025/0181282 | A1* | 6/2025 | Ohira | G06F 3/1208 |

FOREIGN PATENT DOCUMENTS

| | | |
|---|---|---|
| JP | 2013-123813 A | 6/2013 |
| JP | 2022-046156 A | 3/2022 |

* cited by examiner

*Primary Examiner* — Miya J Cato
(74) *Attorney, Agent, or Firm* — Oliff PLC

(57) ABSTRACT

An information processing apparatus include a processor configured to: acquire inspection results on a print product that has been printed in response to multiple print jobs; and generate on each of page groups a reprint job used to print a page indicated as being disqualified by the inspection results, the page group sequentially printed and having an attribute common to the print jobs.

14 Claims, 16 Drawing Sheets

| CYCLE NUMBER | PAGE NUMBER | REPRINT FLAG |
|---|---|---|
| 1 | 1 | 1 |
| | 2 | 0 |
| | 3 | 0 |
| | 4 | 1 |
| | 5 | 1 |
| 2 | 1 | 0 |
| | 2 | 1 |
| | 3 | 0 |
| | 4 | 0 |
| | 5 | 0 |
| 3 | 1 | 0 |
| | 2 | 0 |
| | 3 | 0 |
| | 4 | 0 |
| | 5 | 1 |
| 4 | 1 | 0 |
| | 2 | 1 |
| | 3 | 0 |
| | 4 | 0 |
| | 5 | 1 |

15
DISPLAYING INSPECTION RESULTS
15E
15D
CYCLE PAGE
1 1
1 2
1 3
1 4
1 5
2 1
2 2
2 3
2 4
2 5
3 1
3 2
3 3
3 4
3 5
4 1
4 2
4 3
4 4
4 5
REPRINT
15F
REFERENCE IMAGE
SCAN IMAGE
Sample
Sample
15G
1/15
>
15A
15B
15C 15
DISPLAYING INSPECTION RESULTS
15E
15D
CYCLE PAGE
1 1
1 2
1 3
1 4
1 5
2 1
2 2
REFERENCE IMAGE
SCAN IMAGE
Sample
Sample
15G
1/15
15A
15C
15B
REPRINT
15F

| CYCLE NUMBER | PAGE NUMBER | REPRINT FLAG |
|---|---|---|
| 1 | 1 | 1 |
| 2 | | 0 |
| 3 | | 0 |
| 4 | | 1 |
| 1 | 2 | 1 |
| 2 | | 0 |
| 3 | | 1 |
| 4 | | 0 |
| 1 | 3 | 0 |
| 2 | | 0 |
| 3 | | 0 |
| 4 | | 0 |
| 1 | 4 | 0 |
| 2 | | 0 |
| 3 | | 1 |
| 4 | | 0 |
| 1 | 5 | 1 |
| 2 | | 0 |
| 3 | | 0 |
| 4 | | 1 |

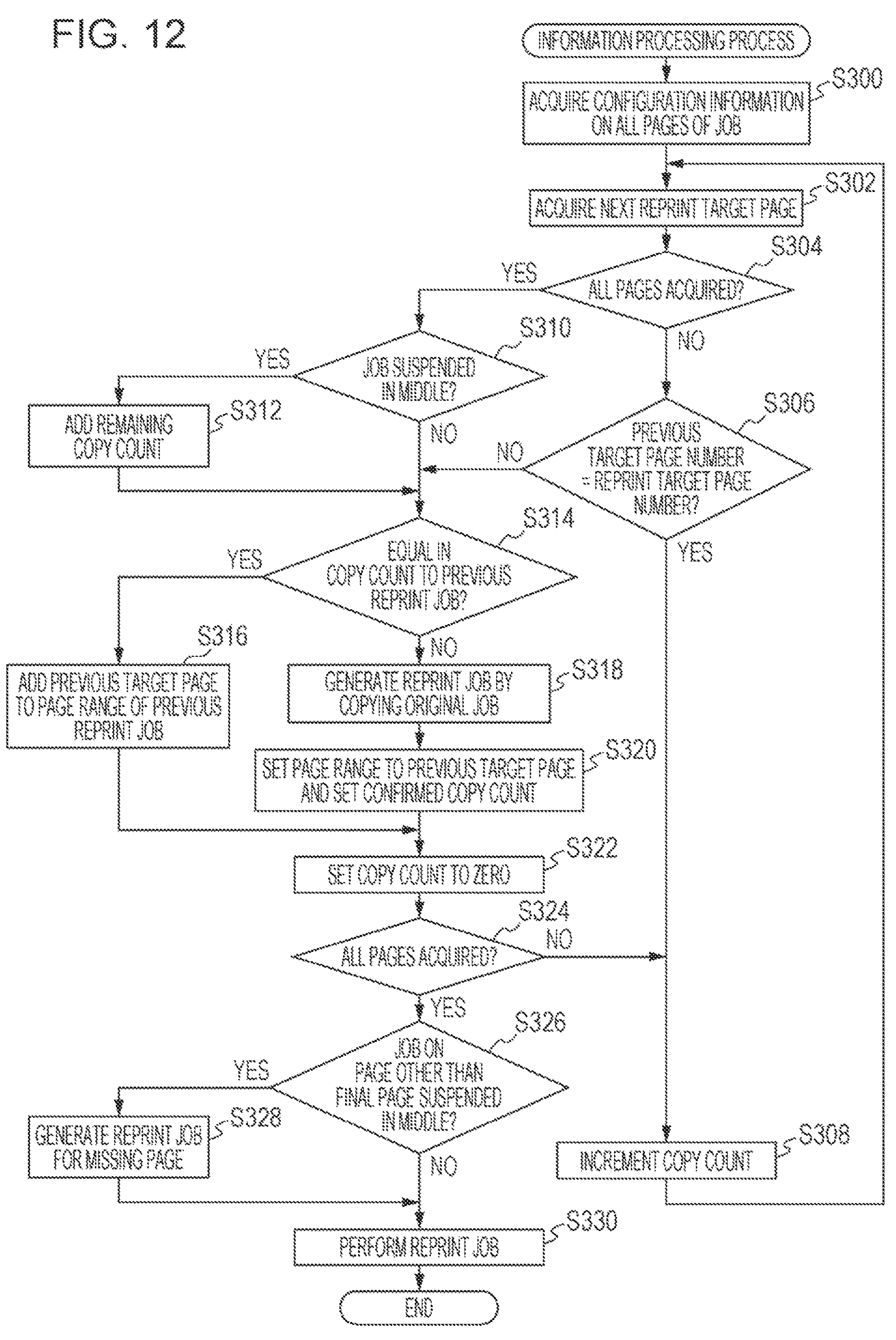
FIG. 12
INFORMATION PROCESSING PROCESS
ACQUIRE CONFIGURATION INFORMATION ON ALL PAGES OF JOB
S300
ACQUIRE NEXT REPRINT TARGET PAGE
S302
ALL PAGES ACQUIRED?
S304
YES
NO
JOB SUSPENDED IN MIDDLE?
S310
YES
NO
ADD REMAINING COPY COUNT
S312
PREVIOUS TARGET PAGE NUMBER = REPRINT TARGET PAGE NUMBER?
S306
NO
YES
EQUAL IN COPY COUNT TO PREVIOUS REPRINT JOB?
S314
YES
NO
ADD PREVIOUS TARGET PAGE TO PAGE RANGE OF PREVIOUS REPRINT JOB
S316
GENERATE REPRINT JOB BY COPYING ORIGINAL JOB
S318
SET PAGE RANGE TO PREVIOUS TARGET PAGE AND SET CONFIRMED COPY COUNT
S320
SET COPY COUNT TO ZERO
S322
ALL PAGES ACQUIRED?
S324
NO
YES
JOB ON PAGE OTHER THAN FINAL PAGE SUSPENDED IN MIDDLE?
S326
YES
NO
GENERATE REPRINT JOB FOR MISSING PAGE
S328
INCREMENT COPY COUNT
S308
PERFORM REPRINT JOB
S330
END

FIG. 14

| CYCLE NUMBER | PAGE NUMBER | REPRINT FLAG |
|---|---|---|
| 1 | 1 | 1 |
| | 2 | 0 |
| | 3 | 0 |
| | 4 | 1 |
| | 5 | 1 |
| 2 | 1 | 0 |
| | 2 | 1 |
| | 3 | 1 |
| | 4 | 0 |
| | 5 | 0 |
| 3 | 1 | 0 |
| | 2 | 0 |
| | 3 | 0 |
| | 4 | 0 |
| | 5 | 1 |

FIG. 15

ORIGINAL PRINT JOB

REPRINT JOB 1 2 3 4 5 1 2 3 4 5 1 2 3 4 5

ORIGINAL PRINT JOB

REPRINT JOB 1 2 3 4 5 1 2 3

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-178660 filed Nov. 8, 2022.

BACKGROUND

(i) Technical Field

The present disclosure relates to an information processing apparatus and a non-transitory computer readable medium.

(ii) Related Art

Techniques described below are available to assist reprinting that is performed in response to a print fault.

Japanese Unexamined Patent Application Publication No. 2022-046156 discloses an information processing apparatus that, in a process of performing sequentially print jobs in accordance with an inspection operation, performs appropriately a recovery operation if a print fault occurs in the middle of a print job.

The information processing apparatus is communicably connected to an image forming apparatus that performs a printing operation. The image forming apparatus has a function of inspecting images formed on recording media in the printing operation. The information processing apparatus includes a job controller and an acquirer. The job controller generates a print job used to cause the image forming apparatus to perform the printing operation and inputs the print job to the image forming apparatus. The acquirer acquires information on a page where a print fault has been detected in the inspection operation. If the information on multiple input print jobs is acquired, the job controller provides an instruction for the image forming apparatus not to perform a print job subsequent to a print job having the page where the print fault has been detected, generates a print job used to recover the print job having the page where the print fault has been detected, and inputs the generated print job to the image forming apparatus.

Japanese Unexamined Patent Application Publication No. 2013-123813 discloses a printer that, when reprinting is performed to a page that is determined to be disqualified in results of an inspection process, reduces time consumed until a subsequent print job is executed.

The printer includes a printing unit, inspection unit, holder unit, paper feeder unit, and controller. The printing unit performs a printing operation on a sheet in response to a print job. In accordance with image data that is obtained by reading the sheet in the printing operation, the inspection unit performs an inspection operation to determine whether a print fault has occurred on a specific page of the print job. The holder unit holds a sheet that is determined in the inspection operation to be free from a print fault. The paper feeder unit feeds a sheet held by the holder unit. If the print job including printing a specific sheet that has been determined in the inspection operation to have a print fault, the controller controls the printing unit such that the printing operation is performed again on the specific sheet of the print job determined in the inspection operation to have the print fault. The controller also controls the paper feeder unit to feed from the holder unit a sheet corresponding to a specific page of the print job that has been determined in the inspection operation to be free from any print fault.

If multiple pages that are determined to be disqualified in an inspection of print results after multiple number of copies of printing are reprinted, an operation of re-arranging multiple print products reprinted may be performed.

SUMMARY

Aspects of non-limiting embodiments of the present disclosure relate to providing an information processing apparatus and non-transitory computer readable medium that are free from an operation of re-arranging multiple print products through reprinting when the reprinting is made on multiple pages that are determined to be disqualified in an inspection of print results after printing of multiple number of copies.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire inspection results on a print product that has been printed in response to multiple print jobs; and generate on each of page groups a reprint job used to print a page indicated as being disqualified by the inspection results, the page group sequentially printed and having an attribute common to the print jobs.

BRIEF DESCRIPTION OF THE DRAWINGS

Exemplary embodiments of the present disclosure will be described in detail based on the following figures, wherein:

FIG. 4 illustrates a structure example of a cycle-based reprint database according to the first exemplary embodiment of the disclosure;

FIG. 12 is a flowchart illustrating an example of an information processing process according to the second exemplary embodiment of the disclosure;

FIG. 14 schematically illustrates as a related-art technique a structure example of a cycle-based reprint information database on which a user makes a setting as to whether to reprint;

FIG. 15 schematically illustrates as a related-art technique a substitution example in which a print product resulting from reprinting a print product having a print fault is substituted;

FIG. 16 schematically illustrates as a related-art technique a substitution example in which a print product resulting from reprinting a print product having a print fault is substituted; and FIG. 17 schematically illustrates as a related-art technique a front view of an example of property setting.

DETAILED DESCRIPTION

Figure 1:
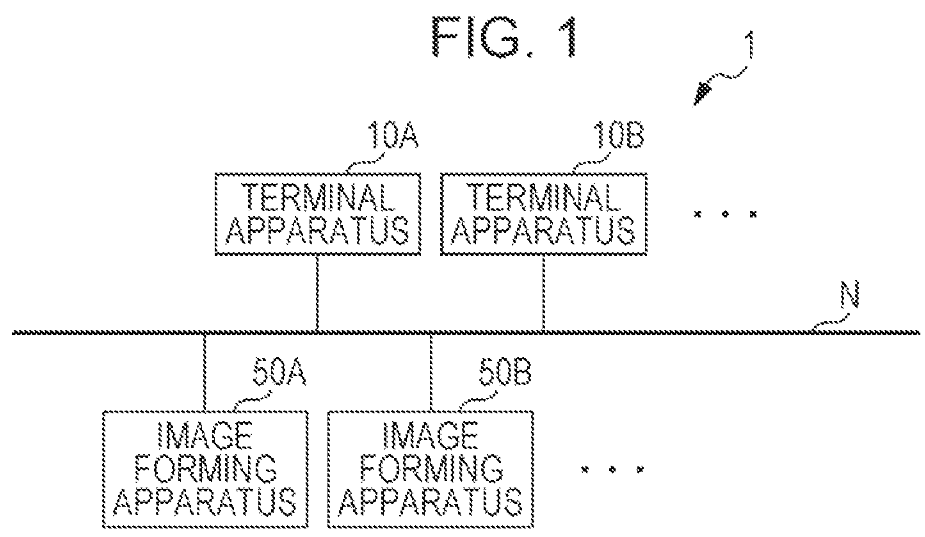
FIG. 1 is a block diagram illustrating a configuration example of an information processing system according to exemplary embodiments of the disclosure.

Referring to the drawings, exemplary embodiments of the disclosure are described in detail below. A technique according to the disclosure is applied to an information processing system of the exemplary embodiments where multiple image forming apparatuses installed in a printing plant are used by a terminal apparatus in the printing plant.

First Exemplary Embodiment

A configuration example of an information processing system 1 of a first exemplary embodiment is described below with reference to FIG. 1. FIG. 1 is a block diagram illustrating the configuration example of the information processing system 1 of the first exemplary embodiment.

Referring to FIG. 1, the information processing system 1 includes multiple terminal apparatuses 10A, 10B, . . . , as information processing apparatuses based on the technique of the disclosure, and multiple image forming apparatuses 50A, 50B, . . . . In the following discussion, each of the terminal apparatuses 10A, 10B, . . . , if not discriminated from each other, is collectively referred to as a terminal apparatus 10. Each of the image forming apparatuses 50A, 50B, . . . , if not discriminated from each other, is collectively referred to as an image forming apparatus 50.

The terminal apparatus 10 may be an information processing apparatus, such as a personal computer or a server computer. According to the first exemplary embodiment, the image forming apparatus 50 may a production printer having an image printing function. The image forming apparatus 50 is not limited to the production printer. The image forming apparatus 50 may be another image forming apparatus, such as a digital multi-function apparatus used in an office and having an image printing function, image reading function, and image transmission function.

The image forming apparatuses 50A, 50B, . . . may not necessarily be identical to each other in specifications and may different from each other in terms of available service, item of settable service, or optional accessory.

The terminal apparatuses 10 and image forming apparatuses 50 are communicably connected to each other via a network N.

According to the first exemplary embodiment, the communication medium N may include an in-house communication network, such as a local-area network (LAN) or a wide-area network (WAN). The network N is not limited to the in-house communication network. The network N may include a public communication network, such as the Internet or a telephone network or a combination of the public communication network and the in-house communication network. According to the first exemplary embodiments, the communication medium N includes a wired network and wireless network. Alternatively, the network N may include one of the wired network and wireless network.

Figure 2:
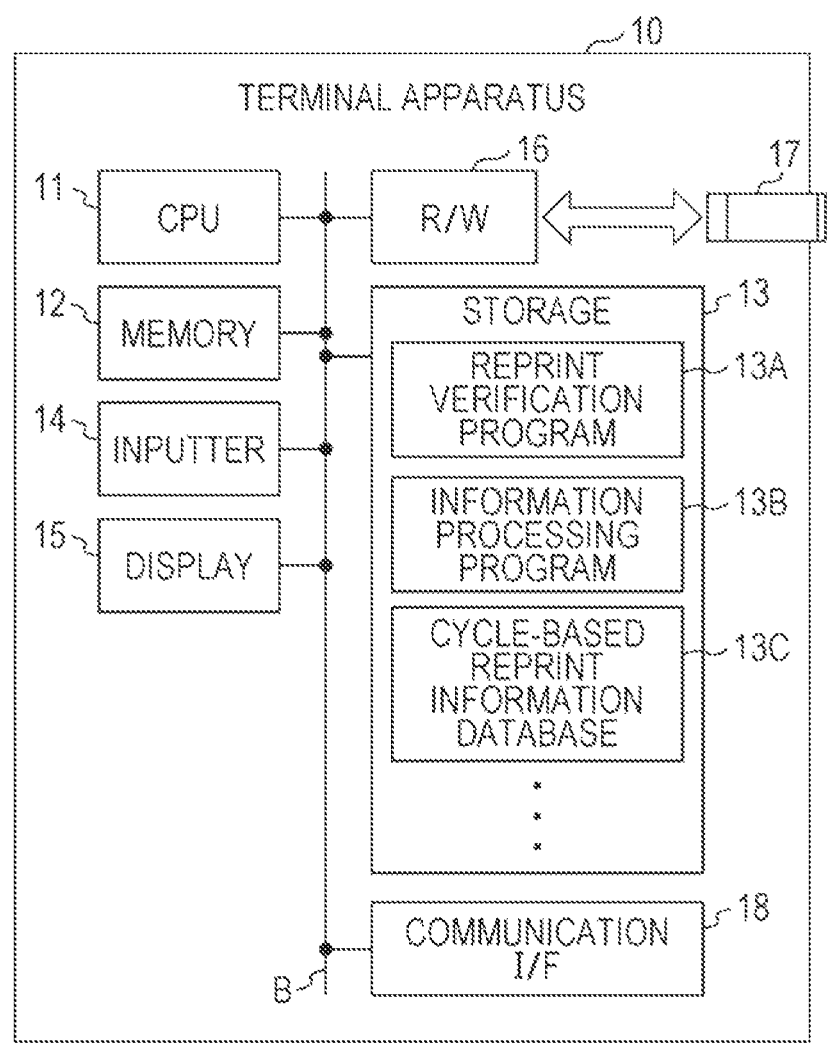
FIG. 2 is a block diagram illustrating a hardware configuration example of a terminal apparatus according to a first exemplary embodiment of the disclosure.

Referring to FIG. 2, the configuration of the terminal apparatus 10 of the first exemplary embodiment is described. FIG. 2 is a block diagram illustrating a hardware configuration example of the terminal apparatus 10 of the first exemplary embodiment.

Referring to FIG. 2, the terminal apparatus 10 includes a central processing unit (CPU) 11, memory 12 serving as a temporary memory region, non-volatile storage 13, inputter 14 including a keyboard and mouse, display 15, such as a liquid-crystal display, medium reader and writer (R/W) 16, and communication interface (UF) 18. The CPU 11, memory 12, storage 13, inputter 14, display 15, medium reader and writer 16, and communication OF 18 are connected to each other via a bus B. The medium reader and writer 16 reads information from or writes information to a recording medium 17.

The storage 13 may be a hard disk drive (HDD), solid-state drive (SSD), or flash memory. A print verification program 13A and information processing program 13B are saved on the storage 13. The print verification program 13A and information processing program 13B are installed on the storage 13 when the medium reader and writer 16 is connected to the recording medium 17 and reads the print verification program 13A and the information processing program 13B from the recording medium 17. The CPU 11 reads the print verification program 13A and information processing program 13B from the storage 13 and loads the print verification program 13A and information processing program 13B onto the memory 12, thereby performing processes corresponding to the print verification program 13A and information processing program 13B.

A cycle-based reprint information database 13C is saved on the storage 13. The cycle-based reprint information database 13C is described in greater detail below.

Figure 3:
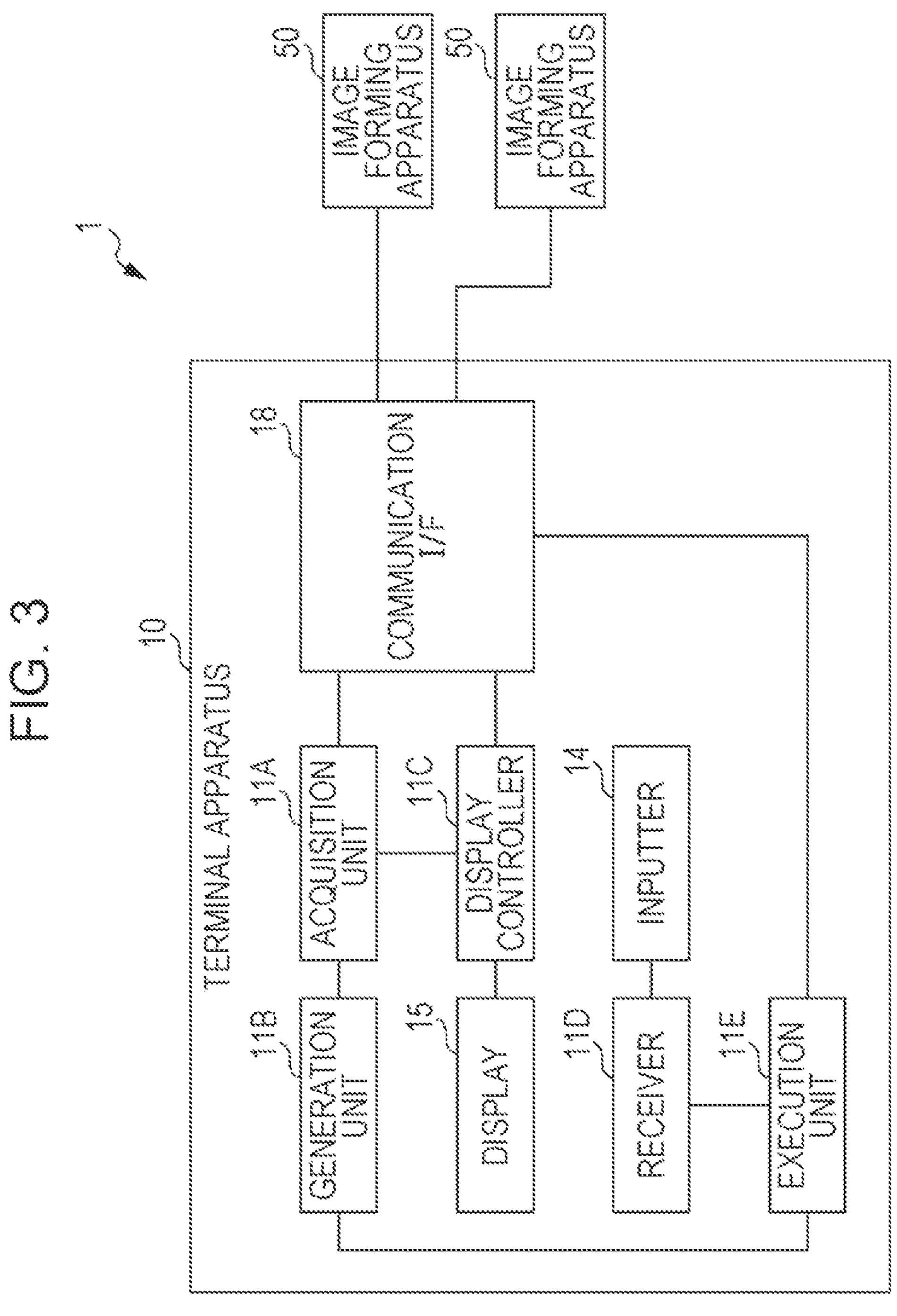
FIG. 3 is a block diagram illustrating a functional configuration example of the terminal apparatus according to the exemplary embodiments of the disclosure.

Referring to FIG. 3, a functional configuration of the terminal apparatus 10 is described below. FIG. 3 is a block diagram illustrating the functional configuration of the terminal apparatus 10.

Referring to FIG. 3, the terminal apparatus 10 includes an acquisition unit 11A, generation unit 11B, display controller 11C, receiver 11D, and execution unit 11E. The CPU 11 in the terminal apparatus 10 executes the print verification program 13A and information processing program 13B, thereby functioning as the acquisition unit 11A, generation unit 11B, display controller 11C, receiver 11D, and execution unit 11E.

The acquisition unit 11A acquires inspection results of a print product that is obtained through printing in response to multiple print jobs. Specifically, the acquisition unit 11A acquires the inspection results by comparing a first image of the print product that is obtained by rasterizing the print job with a second image of the print product that is obtained through printing of the print job. The print job herein refers to a unit of execution of a print process.

In the information processing system 1 of the first exemplary embodiment, the terminal apparatus 10 causes the image forming apparatus 50 to print a print product by transmitting a print job to the image forming apparatus 50. The terminal apparatus 10 stores the print job transmitted to the image forming apparatus 50 and the acquisition unit 11A generates the first image by rasterizing the print job. The image forming apparatus 50 has a second image generation function that generates the second image of the print product by scanning the print product printed by the image forming apparatus 50. The acquisition unit 11A of the first exemplary embodiment uses the second image generation function and acquires the second image from the image forming apparatus 50 that has produced the print product by receiving the print job from the terminal apparatus 10. The disclosure is not limited to this method. For example, the terminal apparatus 10 may cause the image forming apparatus 50 to generate the first image and receive the generated first image from the image forming apparatus 50.

The generation unit 11B generates a reprint job used to print a page that is determined to be disqualified in the inspection results. The reprint job is generated on each page group that is sequentially printed and has an attribute common to the print jobs. According to the first exemplary embodiment, the common attribute is a value indicating a cycle number. The generation unit 11B generates the reprint job on each page group having the common cycle number.

On the other hand, if the second image has a fault, the display controller 11C displays the first and second images side by side on the display 15. According to the first exemplary embodiment, in particular, the display controller 11C displays the second image with a portion of the fault thereof emphasized.

The receiver 11D receives an instruction as to whether to perform reprint when the first and second images are displayed. If the received instruction indicates the reprint, the execution unit 11E performs the reprint job.

If no problem occurs in a page order when the reprint jobs that are to be sequentially performed are performed in bulk printing, the generation unit 11B unites the reprint jobs into one reprint job.

Referring to FIG. 4, the cycle-based reprint information database 13C is described below. FIG. 4 illustrates a structure example of the cycle-based reprint information database 13C of the first exemplary embodiment.

A reprint verification process described below registers, on the cycle-based reprint information database 13C, information on a print product for which the user of the terminal apparatus 10 provides a reprint instruction. For example, the cycle-based reprint information database 13C associates pieces of information on a cycle number, page number, and reprint flag as illustrated in FIG. 4.

The cycle number indicates a number assigned to a cycle at which a print product including multiple pages is repeatedly printed, and the page number indicates a number assigned to a page in each cycle. The reprint flag indicates whether to print a page of interest of the print product at a cycle of interest and is "1" to reprint or "0" not to reprint in the first exemplary embodiment. Referring to FIG. 4, in the cycle number 1, pages 1, 4, and 5 are reprint targets.

According to the first exemplary embodiment, information as to whether to reprint all combinations of cycles and pages printed is registered on the cycle-based reprint information database 13C. The disclosure is not limited to this method. For example, information indicating only cycles and pages that are to be reprinted may be registered on the cycle-based reprint information database 13C.

Figure 15:
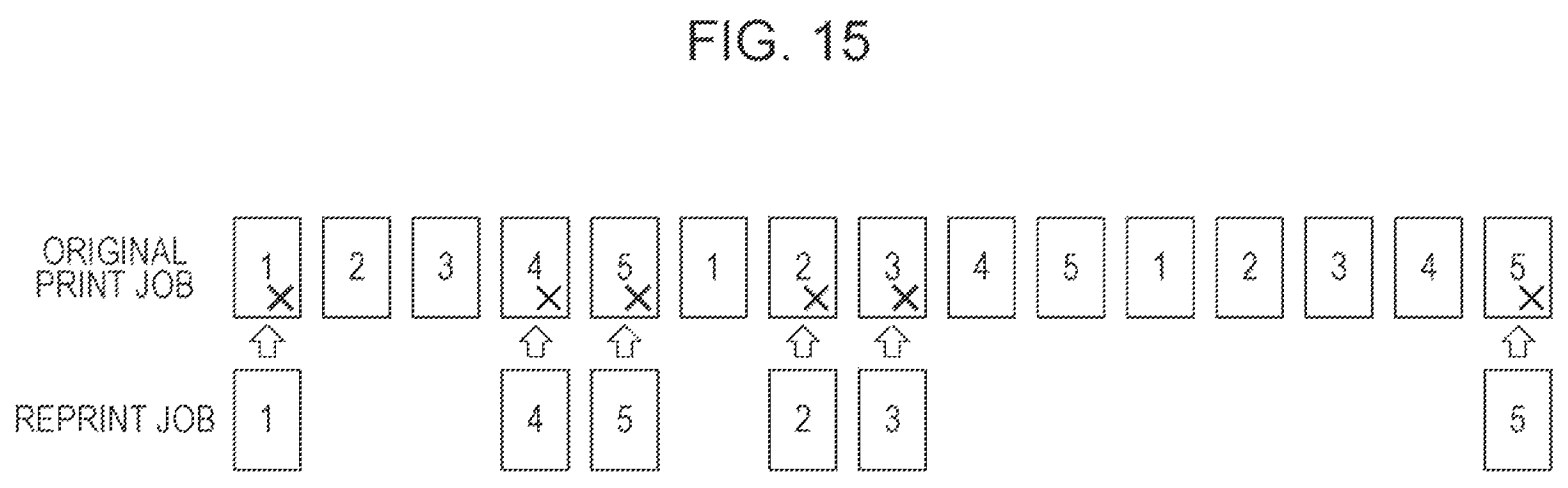
Figure 16:
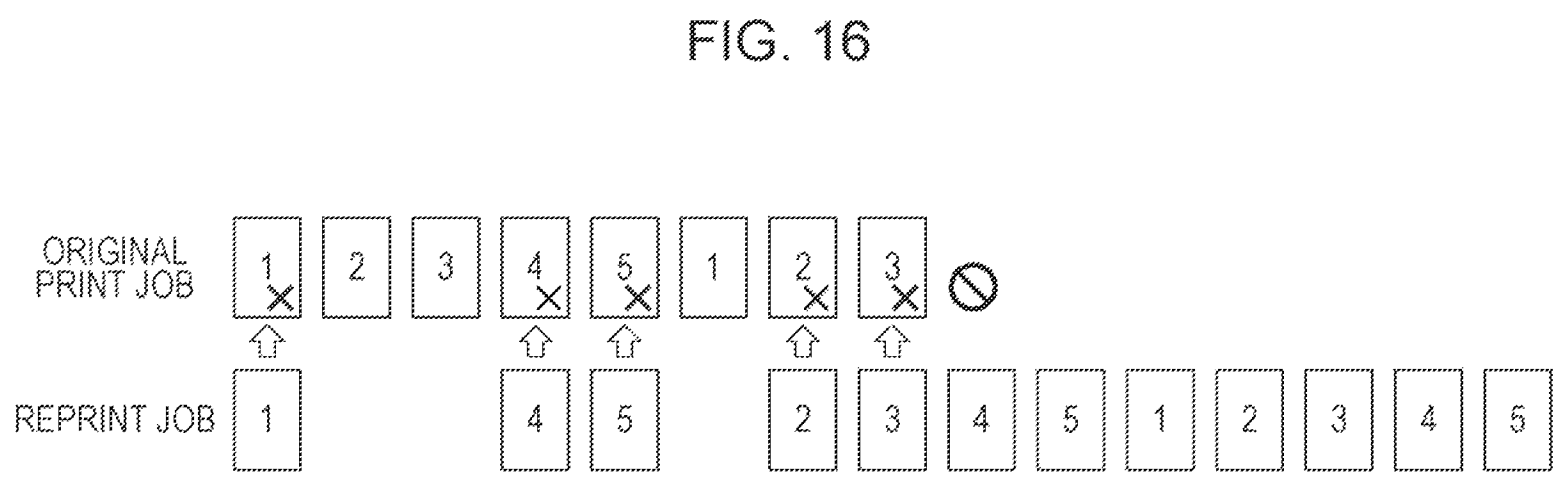
Figure 17:
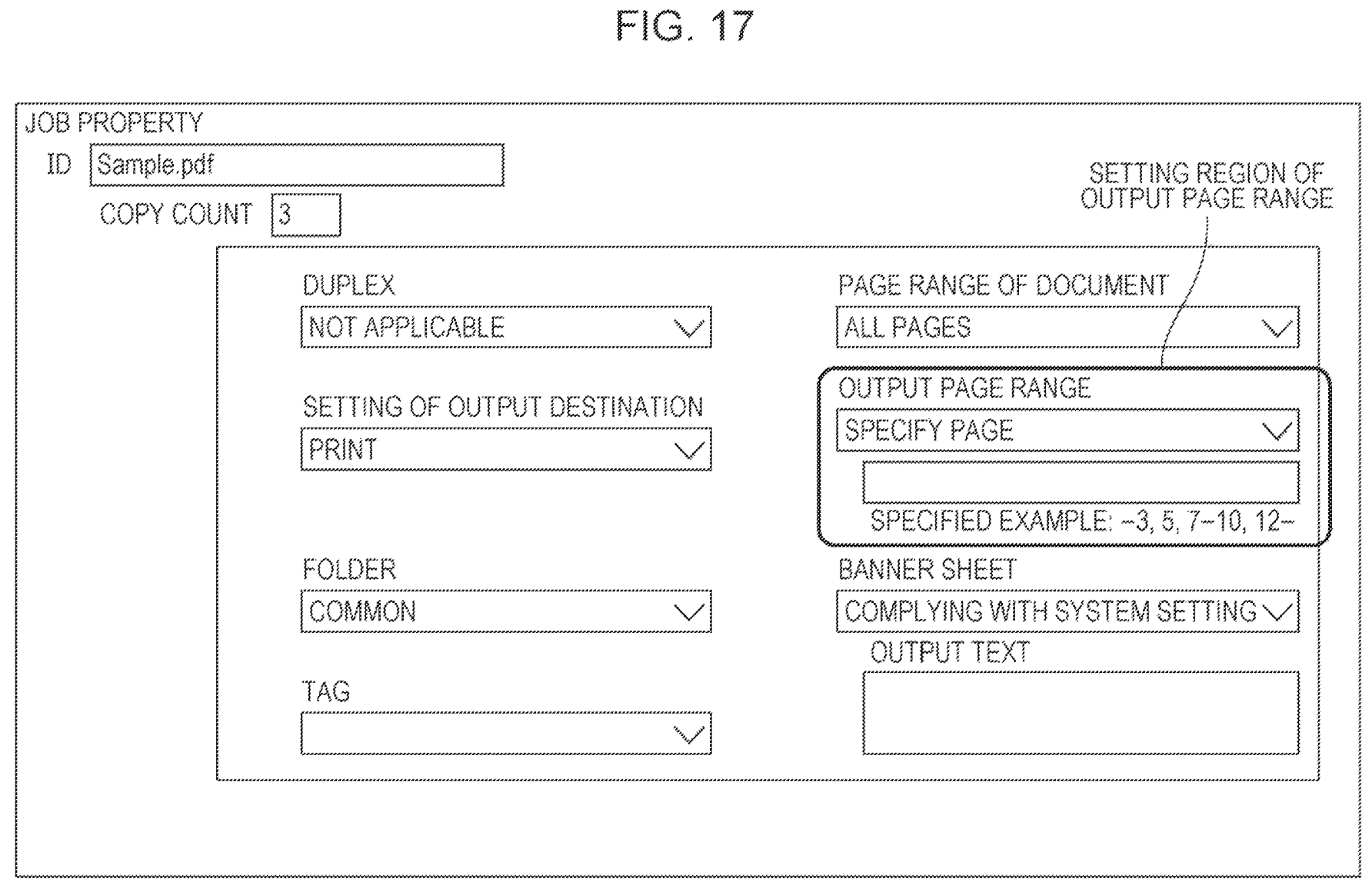

Problems involved in related art are described with reference to FIGS. 14 through 17. FIG. 14 illustrates a structure example of the cycle-based reprint information database 13C obtained when a setting as to whether to reprint is made by a user. FIG. 15 schematically illustrates as a related-art technique substitution example in which a print product resulting from reprinting a print product having a print fault is substituted, and FIG. 16 schematically illustrates as a related-art technique a substitution example in which a print product resulting from reprinting a print product having a print fault is substituted. FIG. 17 schematically illustrates a front view of an example of property setting.

The user may now set reprint as illustrated in FIG. 14.

Referring to FIG. 15, the user may now reprint only a page having a print fault and replace the page of the print product responsive to the original print job with the reprinted page. The print job may be suspended in view of frequent occurrence of print faults. In such a case, as illustrated in FIG. 16, pages having undergone printing are reprinted and printing subsequent to the suspension may be sequentially performed.

In related art, the user may be involved in a complex operation to perform reprint. For example, as illustrated in FIG. 17, the user may specify a range of output pages in the property setting of a corresponding print job before reprinting. When the reprint of the print job is performed, the user may not be able to generate the reprint job by performing a single operation. The user may not be able to specify, in the property setting of the print job, a page range that is different from cycle to cycle. The operation for the reprint may be repeated on each cycle. As a result, the user may perform the following operations in combination:

1. With a copy count of the print job set to 1, an output page range is modified to [1, 4, 5], and then the reprinting is performed.
2. With the copy count of the print job set to 1, the output page range is modified to [2, 3], and then the reprinting is performed.
3. With the copy count of the print job set to 1, the output page range is modified to [5], and then the reprinting is performed.
4. With the copy count of the print job set to 3, the output page range is modified to [all pages] (reinstating the original state).

The terminal apparatus 10 of the first exemplary embodiments automatically generates a reprint job in a manner free from these user operations, possible erratic operation involved, and re-arrangement operation of multiple print products reprinted.

The operation of the information processing system 1 of the first exemplary embodiment is described with reference to FIGS. 5 through 8.

Figure 5:
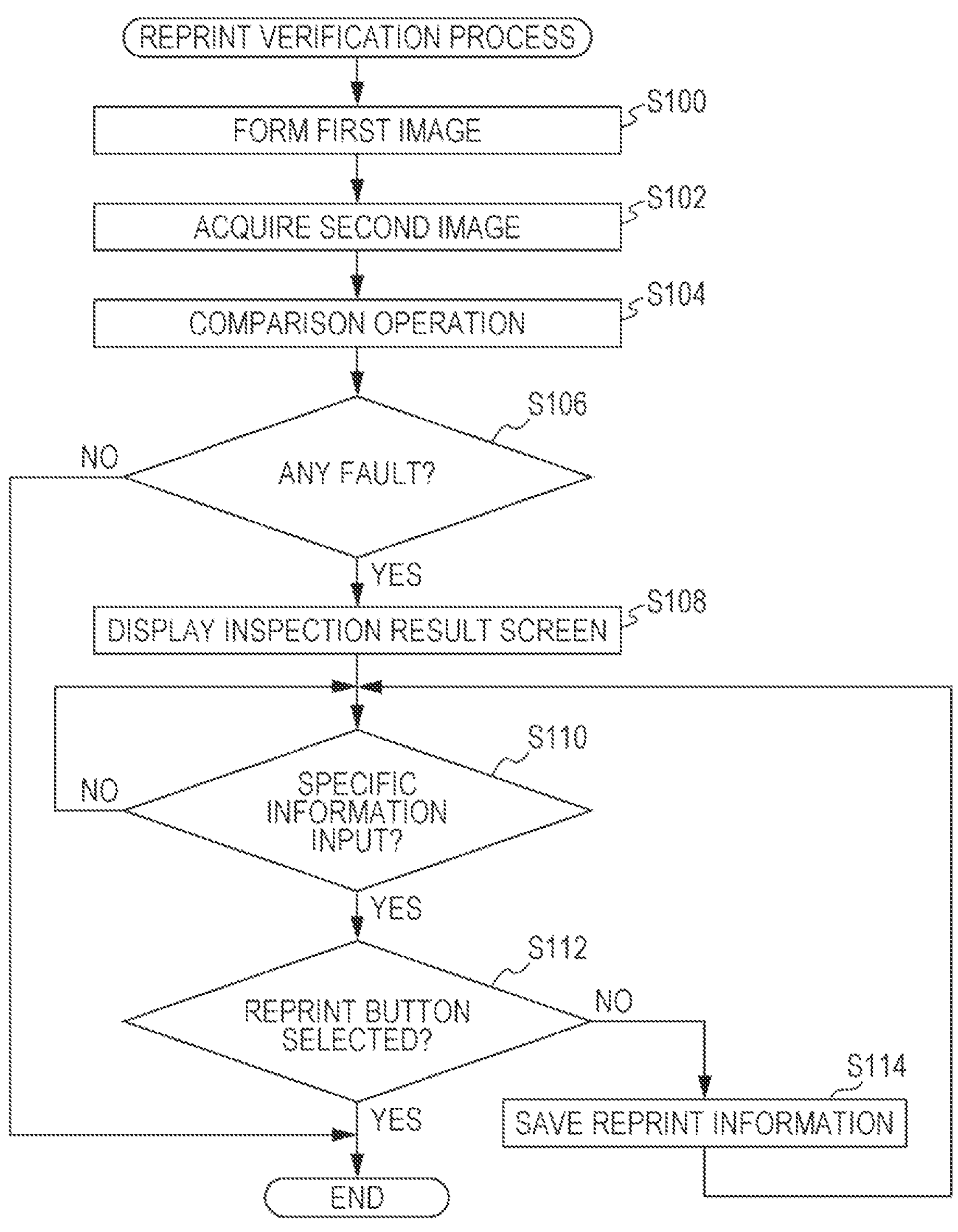
FIG. 5 is a flowchart illustrating an example of a reprint verification process according to the exemplary embodiments of the disclosure.

The operation of the terminal apparatus 10 performing the reprint verification process is described with reference to FIGS. 5 and 6. FIG. 5 is a flowchart illustrating an example of the reprint verification process of the first exemplary embodiment. For convenience of explanation, the cycle-based reprint information database 13C is constructed with the reprint flag set to a default value "0."

In the information processing system 1, one of the image forming apparatuses 50 completes the printing in response to a print job (hereinafter referred to as a "target print job") when the user provides an instruction to the terminal apparatus 10. The CPU 11 in the terminal apparatus 10 then executes the print verification program 13A. The reprint verification process illustrated in FIG. 5 is thus performed.

In step S100 in FIG. 5, the CPU 11 generates the first image of the print product printed in the target print job by rasterizing the target print job. In step S102, the CPU 11 acquires the second image responsive to the target print job using the second image generation function.

In step S104, the CPU 11 performs a comparison operation to compare the generated first image with the acquired second image between the corresponding pages. According to the first exemplary embodiment, position alignment is performed on the corresponding first and second images and a difference between corresponding pixels is calculated to determine a difference image. In this case, if at least one of the first image or the second image is a color image or a grayscale image, the difference is determined after the images are binarized. The disclosure is not limited to this method. For example, if the image is a color image or a grayscale image, the comparison operation may be performed to determine the difference image by determining the difference after the position alignment.

In step S106, the CPU 11 determines whether the comparison results indicate a fault in the print product. If the comparison results indicate no fault, the reprint verification process ends. If the comparison results indicate a fault, the CPU 11 proceeds to step S108. According to the first exemplary embodiment, the fault determination is performed by determining whether a pixel region having an area equal to or larger than a predetermined area is present in the difference image obtained through the comparison operation. The disclosure is not limited to this method. For example, the fault determination may be performed by determining whether there is a pixel region that includes only pixel values equal to or higher than a predetermined threshold and has an area equal to or larger than a predetermined area.

In step S108, using the difference image, the CPU 11 controls the display 15 such that an inspection result display screen having a predetermined structure is displayed. In step S110, the CPU 11 waits on standby until specific information has been received. FIG. 6 illustrates an example of the inspection result display screen of the first exemplary embodiment.

Figure 6:
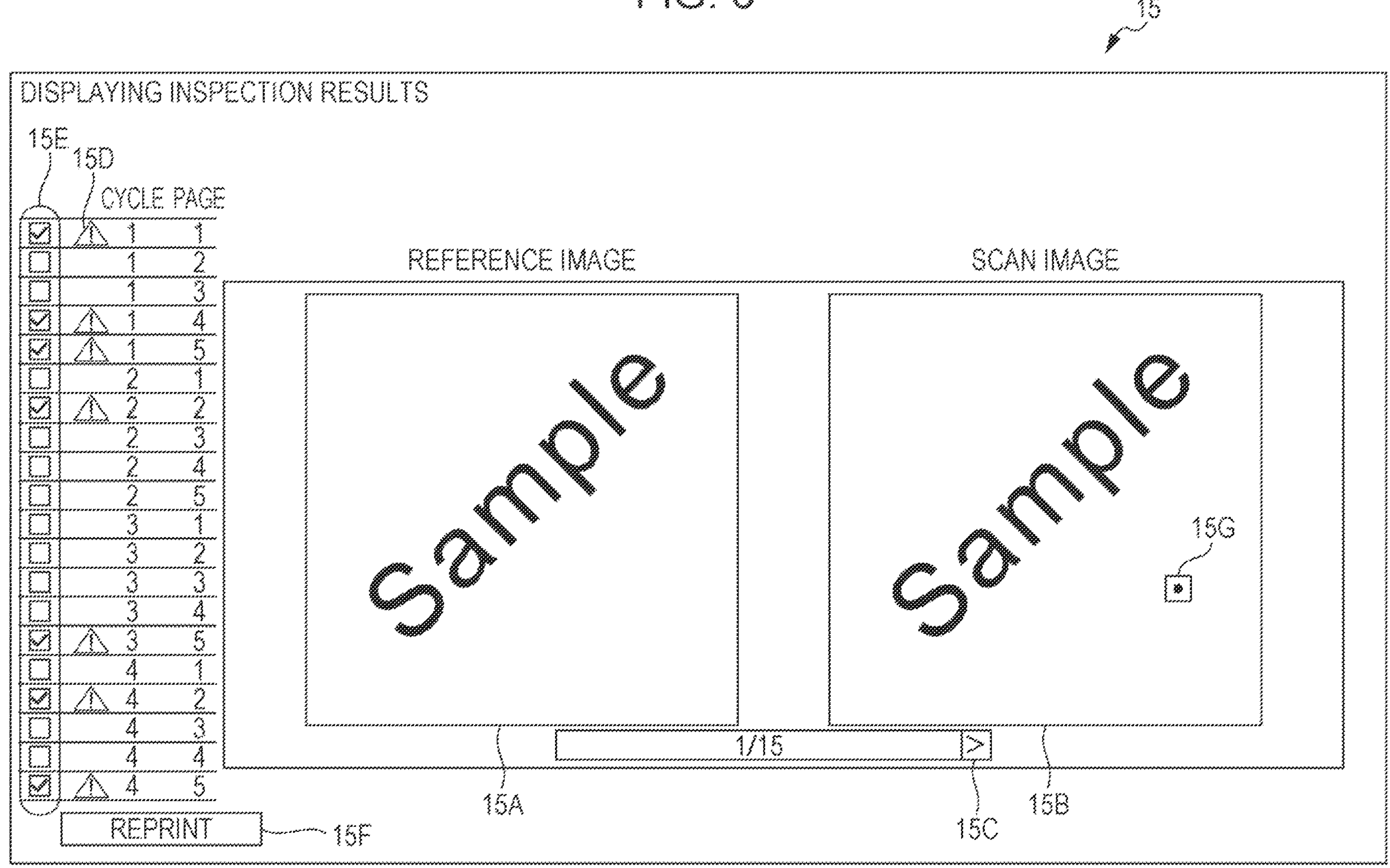
FIG. 6 is a front view of an example of an inspection result display screen according to the first exemplary embodiment of the disclosure.

Referring to FIG. 6, the first image ("reference image" in FIG. 6) 15A corresponding to a first page of the print product responsive to the target print job and the second image ("scan image" in FIG. 6) 15B are displayed side by side on the inspection result display screen of the first exemplary embodiment. A page turning button 15C to turn display page of the first image 15A and the second image 15B is displayed below a display region of the first image 15A and the second image 15B on the inspection result display screen. The user may turn the first image 15A and the second image 15B to be displayed by selecting the page turning button 15C using the inputter 14.

The second image 15B is displayed with a portion of a fault thereof emphasized on the inspection result display screen. According to the first exemplary embodiment, a fault emphasis frame 15G surrounding a faulty portion is displayed to emphasize the faulty portion as illustrated in FIG. 6. The disclosure is not limited to this method. For example, the faulty portion may be emphasized by coloring the faulty portion with a specific color, such as red or blue, by blinking the faulty portion, or by reverse-displaying the fault portion.

Cycle numbers and page numbers corresponding to print products responsive to the target print job are displayed in the order of printing on the left side of the inspection result display screen of the first exemplary embodiment. The inspection result display screen displays a fault occurrence mark 15D on each combination of cycle number and page number for a page that has been determined to have a fault in the operation in step S106. On each combination of cycle number and page number, a reprint specifying region 15E is displayed to specify a page that is to be reprinted in response to inspection results provided by a user who has visually checked the print product.

When the inspection result display screen illustrated in FIG. 6 is displayed, the user verifies each of the second images 15B by turning the display pages of the first image 15A and the second image 15B and specifies, using the inputter 14, the reprint specifying region 15E corresponding to the page that is to be reprinted. At the completion of specifying all pages that are to be reprinted, the user selects a reprint button 15F using the inputter 14. When the reprint specifying region 15E or reprint button 15F is selected by the user, the yes path is followed from step S110 and the CPU 11 proceeds to step S112.

In step S112, the CPU 11 determines whether the reprint button 15F has been selected by the user. If the no path is followed, the CPU 11 determines that a page to be reprinted is specified by the user and then proceeds to step S114. In step S114, the CPU 11 saves on (updates) the cycle-based reprint information database 13C "1" for the reprint flag corresponding to the page to be reprinted specified by the user, and then returns to step S110. If the yes path is followed from step S112, the CPU 11 ends the reprint verification process.

The reprint verification process may now set the cycle-based reprint information database 13C to the status as illustrated in FIG. 4. In the reprint verification process described above, the print status of the second image 15B is verified only when the CPU 11 determines that a print product has a fault. The disclosure is not limited to this method. For example, regardless of the determination results by the CPU 11, the CPU 11 may cause the user to verify the print status of the second image 15B by displaying the inspection result display screen in FIG. 6.

Figure 7:
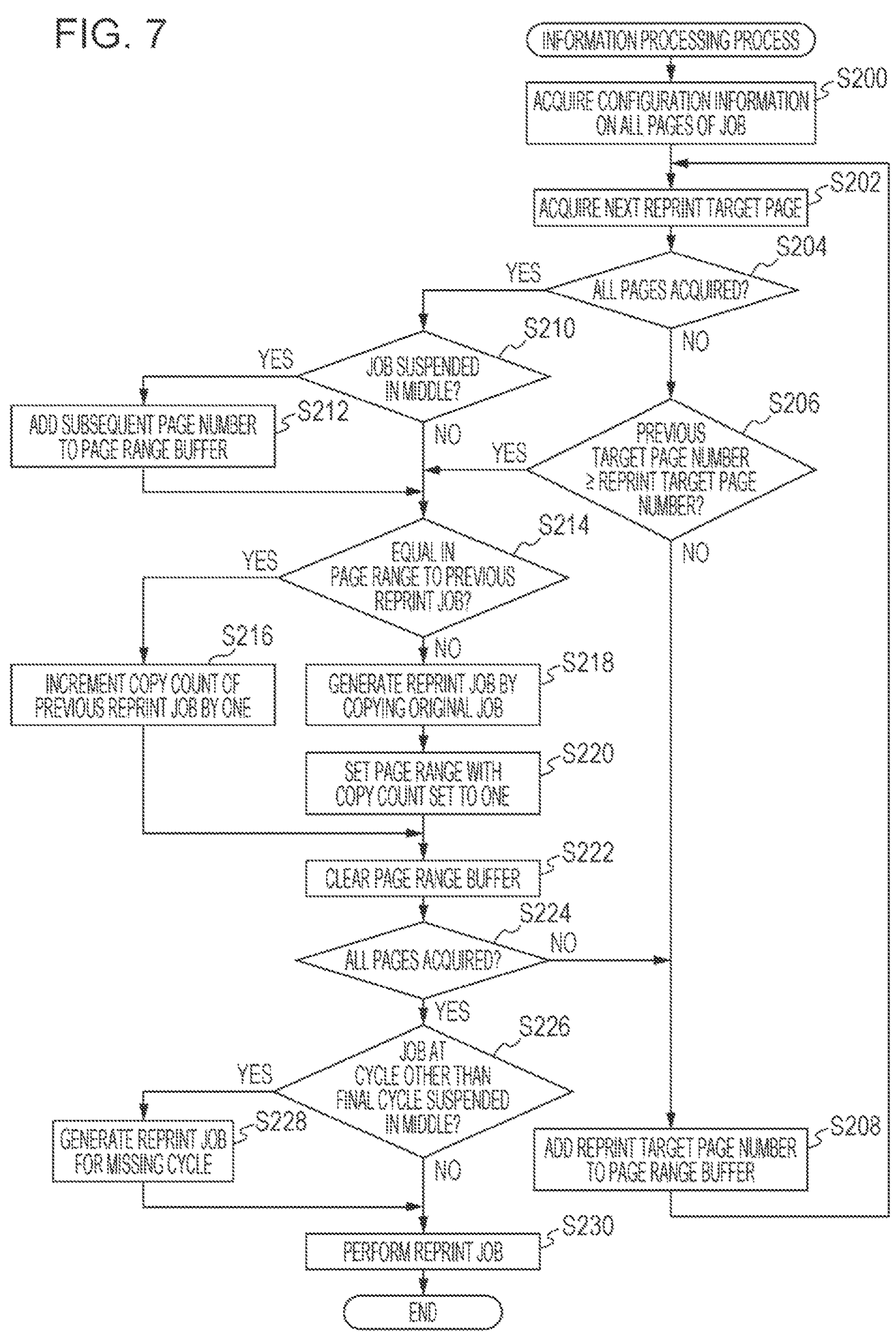
FIG. 7 is a flowchart illustrating an example of an information processing process according to the first exemplary embodiment of the disclosure.

Referring to FIG. 7, the operation of the terminal apparatus 10 of the first exemplary embodiment performing the information processing process is described. FIG. 7 is a flowchart illustrating an example of the information processing process.

If the reprint button 15F is selected on the inspection result display screen by the user in the information processing system 1 of the first exemplary embodiment, the CPU 11 in the terminal apparatus 10 executes the information processing program 13B, thereby performing the information processing process in FIG. 7. In the following discussion, the cycle-based reprint information database 13C is in the status illustrated in FIG. 4.

In step S200 in FIG. 7, the CPU 11 reads information on all pages (hereinafter referred to as "configuration information") registered on the cycle-based reprint information database 13C. In step S202, the CPU 11 acquires a page to be reprinted next (hereinafter referred to as "reprint target page") from the read configuration information. It is noted that if the operation in step S202 is performed for the first time, a next reprint target page is a first reprint page. For example, if the configuration information illustrated in FIG. 4 is retrieved from the cycle-based reprint information database 13C, the reprint target page is a first page of a cycle number 1 having a reprint flag "1."

In step S204, the CPU 11 determines whether all the reprint target pages are acquired in step S202. If the yes path is followed, the CPU 11 proceeds to step S210 or if the no path is followed, the CPU 11 proceeds to step S206.

In step S206, the CPU 11 determines whether the page number of the reprint target page acquired in the operation in the previous step S202 is equal to or higher than the page number of the reprint target page acquired in the operation in the present step S202. If the yes path is followed from step S206, the CPU 11 proceeds to step S214. If the no path is followed from step S206, the CPU 11 proceeds to step S208. It is noted that if the operation in step S206 is performed for the first time, the process is forced to proceed to step S208.

In step S208, the CPU 11 adds a page number of the reprint target page to a buffer indicating a page range (hereinafter referred to as a "page range buffer") and returns to step S202.

In step S210, the CPU 11 determines whether the target print job is suspended in the middle. If the no path is followed from step S210, the CPU 11 proceeds to step S214. If the yes path is followed from step S210, the CPU 11 proceeds to step S212. In step S212, the CPU 11 adds, to the page range buffer, the page number of a page subsequent to the page printed last and then proceeds to step S214.

In step S214, the CPU 11 determines whether the target print job is equal in the range of page numbers saved on the page range buffer to the previously generated reprint job. If the yes path is followed from step S214, the CPU 11 proceeds to step S216. In step S216, the CPU 11 increments the copy count of the previously generated reprint job by one and then proceeds to step S222.

If the no path is followed from step S214, the CPU 11 proceeds to step S218. The CPU 11 generates a reprint job by copying an original print job. In step S220, the CPU 11 completes the reprint job by setting the copy count of the generated reprint job to one and setting the page number saved on the page range buffer. It is noted that if the operation in step S214 is performed for the first time, the process is forced to proceed to step S218.

The CPU 11 clears the contents on the page range buffer in step S222 and determines in step S224 whether all the reprint target pages are acquired. If the no path is followed from step S224, the CPU 11 proceeds to step S208. If the yes path is followed from step S224, the CPU 11 proceeds to step S226.

In step S226, the CPU 11 determines whether the target print job in a cycle other than the last cycle is suspended in the middle. If the no path is followed from step S226, the CPU 11 proceeds to step S230 or if the yes path is followed from step S226, the CPU 11 proceeds to step S228. In step S228, the CPU 11 generates a reprint job for a missing copy count and then proceeds to step S230.

In step S230, the CPU 11 causes the image forming apparatus 50 to perform printing responsive to the reprint job by performing, in the order of generation of the reprint jobs, the reprint jobs generated in the process described above. The CPU 11 then ends the information processing process.

If the information on the cycle-based reprint information database 13C is the status illustrated in FIG. 4, the pages serving as reprint targets are listed as follows:

Cycle number 1: pages 1, 4, and 5,

Cycle number 2: page 2,

Cycle number 3: page 5, and

Cycle number 4: pages 2 and 5.

The reprint jobs generated in the information processing process may thus be reduced efficiently to a smaller job count as listed as follows:

Reprint job 1→copy count: 1, target pages: 1, 4, and 5, and

Reprint job 2→copy count: 2, target pages: 2 and 5

Figure 8:
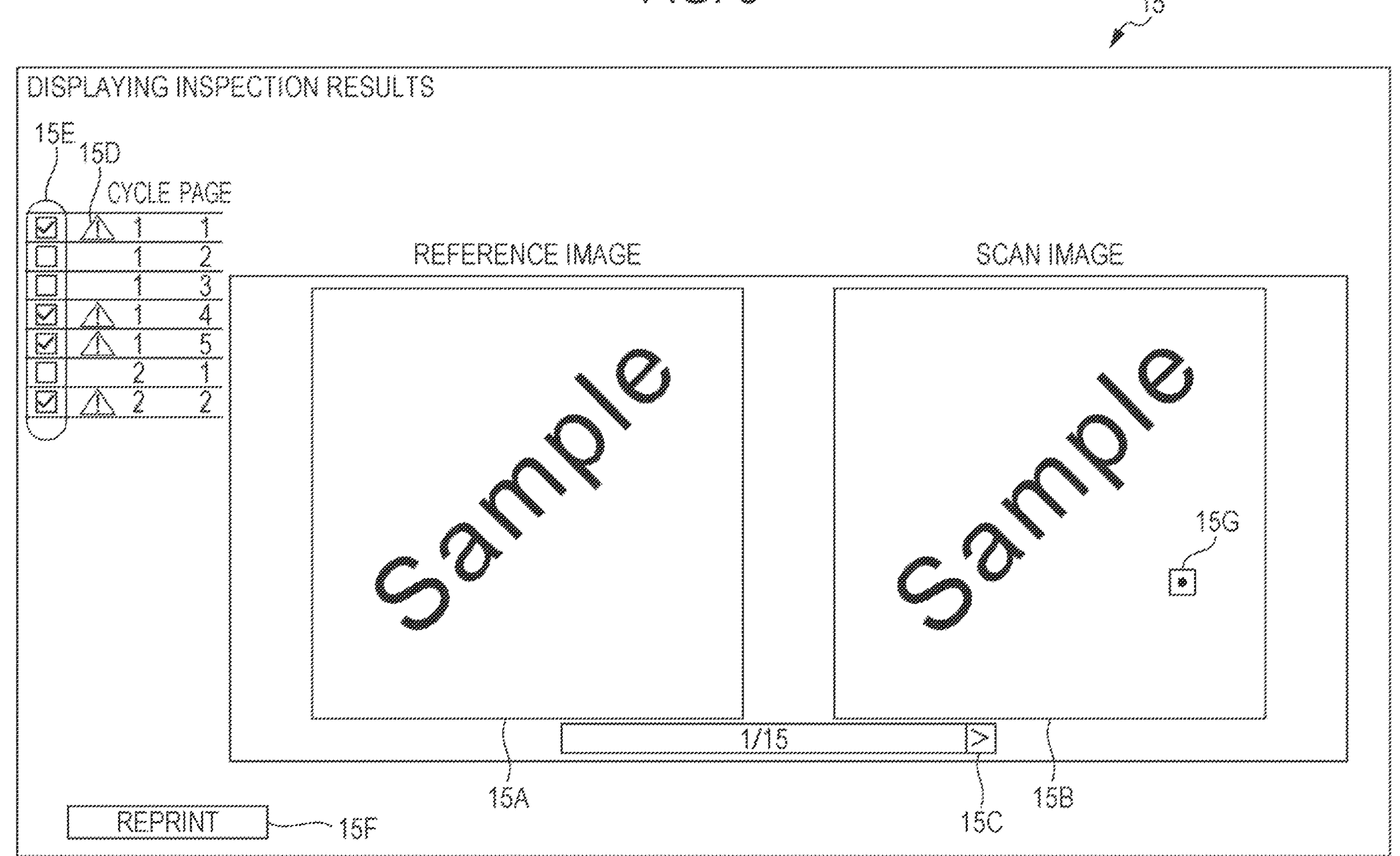
FIG. 8 is a front view of another example of the inspection result display screen according to the first exemplary embodiment of the disclosure.

If the target print job is suspended in the middle as illustrated in FIG. 8, in other words, if printing is suspended when page 2 of the cycle number 2 is completed, the reprint jobs generated in the information processing process may also be reduced efficiently to a smaller job count.

Reprint job 1→copy count: 1, target pages: 1, 4, and 5,

Reprint job 2→copy count: 1, target pages: 2 through 5, and

Reprint job 3→copy count: 2, target pages: all pages

According to the first exemplary embodiment, the case that the page is difficult to replace in the middle of the print cycle responsive to the print job is not contemplated. The disclosure is not limited to this method. For example, if the page is difficult to replace in the middle of the print cycle responsive to the print job, the reprinting may be performed by a unit of cycle.

According to the first exemplary embodiment, if the page is difficult to replace in the middle, the print job may be a stapling job. The stapling job refers to a job that pushes stapling wire through multiple print products by a print cycle to fasten the print products. The case that the page is difficult to replace in the middle of the print cycle responsive to the print job is not limited to the stapling job. For example, if saddle stitching is performed on the print products, the page may be difficult to replace in the middle.

Second Exemplary Embodiment

Figure 9:
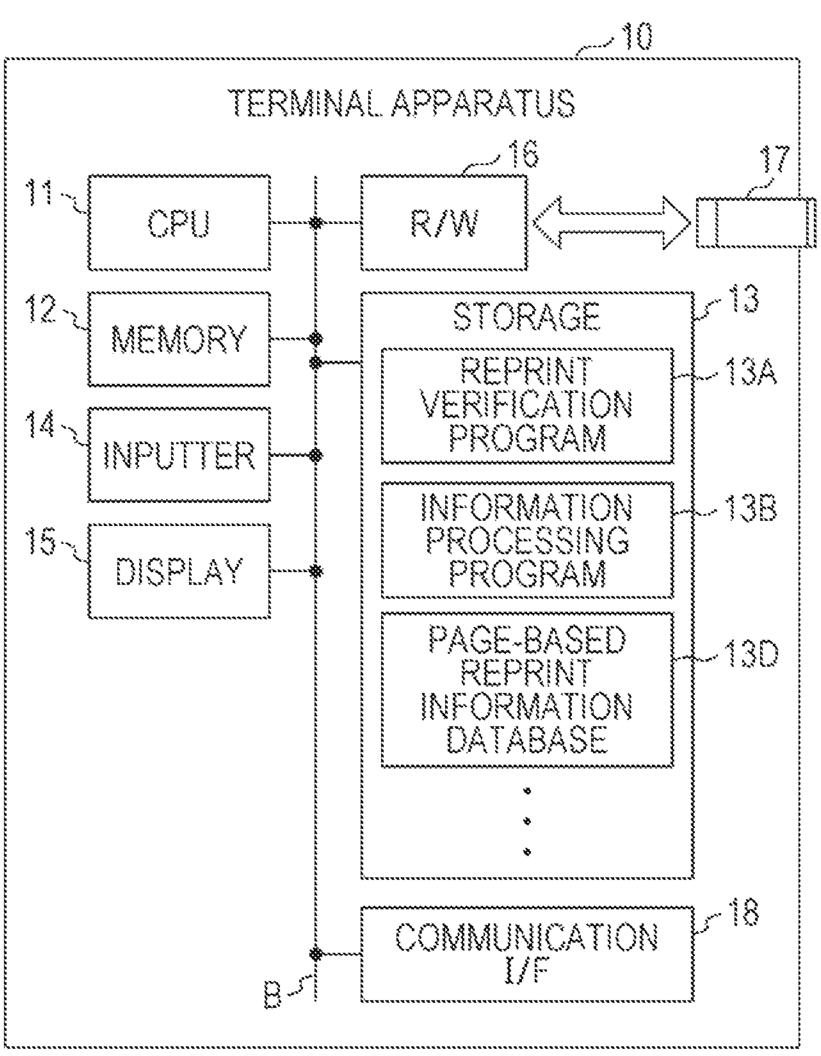
FIG. 9 is a block diagram illustrating a hardware configuration example of a terminal apparatus according to a second exemplary embodiment of the disclosure.

In a second exemplary embodiment, the common attribute is a value indicating a page number and a reprint job is generated on each page group having an identical page number. The information processing system 1 of the second exemplary embodiment is identical in configuration to the information processing system 1 of the first embodiment. Referring to FIG. 9, the configuration of the terminal apparatus 10 of the second exemplary embodiment is described. FIG. 9 is a block diagram illustrating a hardware configuration of the terminal apparatus 10 of the second exemplary embodiment. In FIG. 9, elements respectively identical to elements in FIG. 2 are designated with the same reference numerals and the discussion thereof is omitted herein.

Referring to FIG. 9, the terminal apparatus 10 of the second exemplary embodiment is different from the terminal apparatus 10 of the first exemplary embodiment in that the terminal apparatus 10 of the second exemplary embodiment includes a page-based reprint information database 13D in place of the cycle-based reprint information database 13C. The second exemplary embodiment is also different from the first exemplary embodiment in that the reprint verification process and information processing process in the second exemplary embodiment are based on processing performed in accordance with a unit of page in place of a unit of cycle.

The functional configuration of the terminal apparatus 10 of the second exemplary embodiment is generally identical to the functional configuration of the terminal apparatus 10 of the first exemplary embodiment illustrated in FIG. 3. However, the second exemplary embodiment is different from the first embodiment in that in the second exemplary embodiment the common attribute applied by the generation unit 11B is a value indicating a page number and a reprint job is generated on each page group having the same page number.

Figure 10:
FIG. 10 schematically illustrates a structure example of a page-based reprint information database according to the second exemplary embodiment of the disclosure.

The page-based reprint information database 13D of the second exemplary embodiment is described below with reference to FIG. 10. FIG. 10 schematically illustrates a structure example of the page-based reprint information database 13D of the second exemplary embodiment.

Information on a print product for which the user of the terminal apparatus 10 provides a reprint instruction through the reprint verification process is registered on the page-based reprint information database 13D. The page-based reprint information database 13D saves pieces of information on a cycle number, page number, and reprint flag in an associated form as illustrated in FIG. 10.

The cycle number indicates a number assigned to a cycle by which a print product including multiple pages is repeatedly printed and the page number indicates a number assigned to each page of a corresponding cycle. The reprint flag is information indicating whether to reprint a print product at a corresponding page number at a corresponding cycle number. According to the second exemplary embodiment, the reprint flag "1" is saved when reprint is performed or the reprint flag "0" is saved when reprint is not performed. Referring to FIG. 10, pages 1 at cycle numbers 1 and 4 are saved as reprint targets.

According to the second exemplary embodiment, information on whether to reprint or not is registered at all combinations of cycle numbers and pager numbers on the page-based reprint information database 13D. The disclosure is not limited to this method. For example, only information indicating a cycle and page to be reprinted may be registered on the page-based reprint information database 13D.

The processes of the information processing system 1 of the second exemplary embodiment is described below. The reprint verification process of the terminal apparatus 10 of the second exemplary embodiment is identical to the reprint verification process in the first exemplary embodiment except that the unit of cycle is replaced with the unit of page in the second exemplary embodiment. The discussion of the reprint verification process of the second exemplary embodiment is thus omitted herein.

Figure 11:
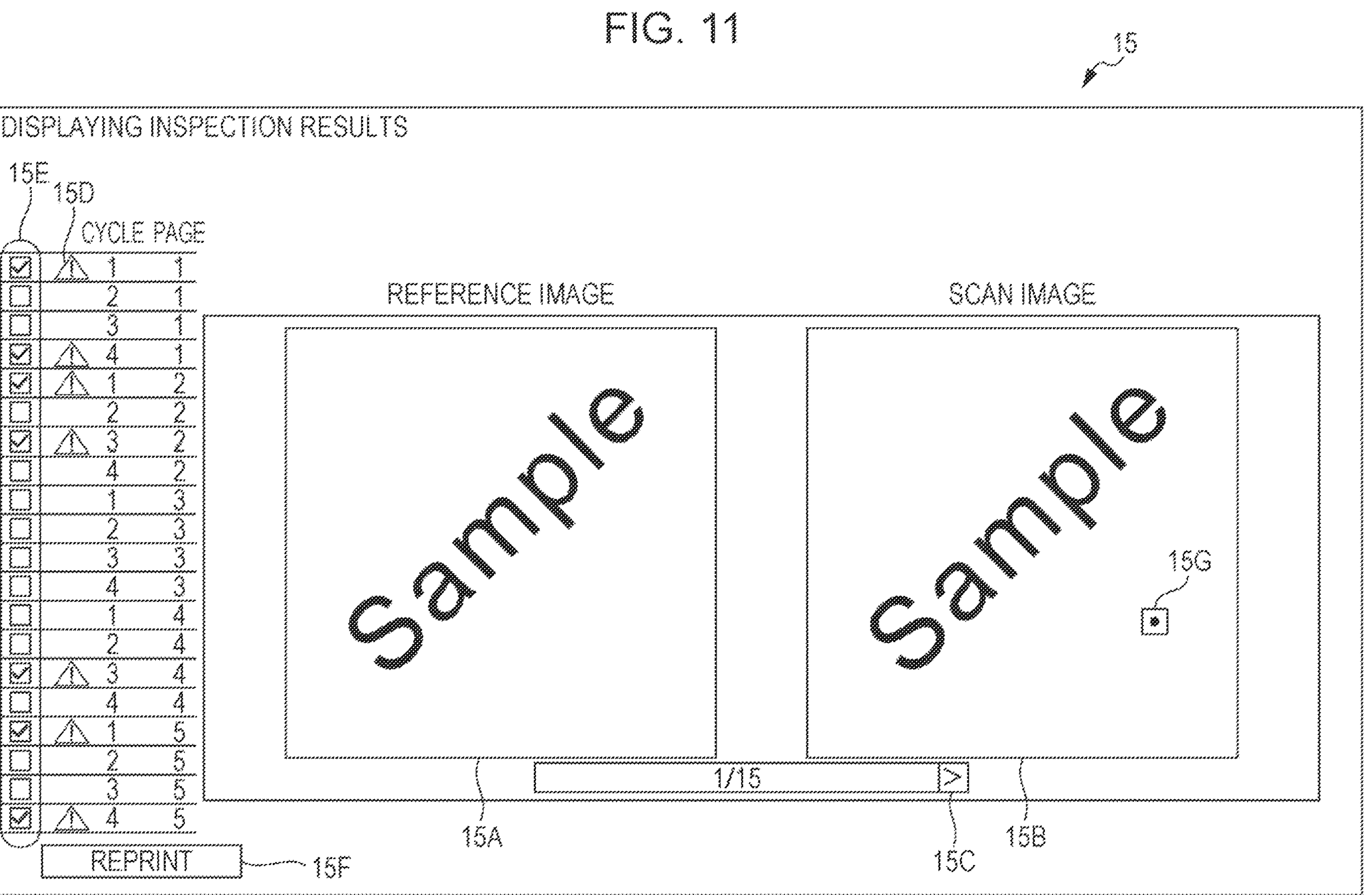
FIG. 11 is a front view of an example of an inspection result display screen according to the second exemplary embodiment of the disclosure.

An inspection result display screen displayed in the reprint verification process is illustrated in FIG. 11. FIG. 11 is a front view of an example of the inspection result display screen.

The flow of the information processing process of the terminal apparatus 10 of the second exemplary embodiment is described with reference to FIG. 12. FIG. 12 is a flowchart illustrating an example of the information processing process of the second exemplary embodiment.

The information processing system 1 performs the information processing process illustrated in FIG. 12 when the CPU 11 in the terminal apparatus 10 performs the information processing program 13B in response to the selection of the reprint button 15F on the inspection result display screen by the user. In the following discussion, the page-based reprint information database 13D is in the status illustrated in FIG. 10.

In step S300 in FIG. 12, the CPU 11 reads information on all pages (hereinafter referred to as "configuration information") registered on the page-based reprint information database 13D. In step S302, the CPU 11 acquires from the read configuration information a page serving as a next reprint target (hereinafter referred to as a "reprint target page"). It is noted that if the operation in step S302 is performed for the first time, the next reprint target page is the first reprint page. For example, if the configuration information is read from the page-based reprint information database 13D in FIG. 10, the reprint target page acquired first is a page with a reprint flag "1" appearing first at the cycle number 1.

In step S304, the CPU 11 determines whether all reprint target pages are acquired in step S302. If the yes path is followed from step S304, the CPU 11 proceeds to step S310 or if the no path is followed from step S304, the CPU 11 proceeds to step S306.

In step S306, the CPU 11 determines whether the page number of the reprint target page acquired in the previous step S302 is equal to the page number of the reprint target page acquired in the present step S302. If the no path is followed from step S306, the CPU 11 proceeds to step S314. If the yes path is followed from S306, the CPU 11 proceeds to step S308. It is noted that if the operation in step S306 is performed for the first time, the process is forced to proceed to step S308.

In step S308, the CPU 11 increments the copy count by one and then returns to step S302.

In step S310, the CPU 11 determines whether the target print job is suspended in the middle. If the no path is followed from step S310, the CPU 11 proceeds to step S314. If the yes path is followed from S310, the CPU 11 proceeds to step S312. In step S312, the CPU 11 adds a remaining copy count to the copy count and then proceeds to step S314.

In step S314, the CPU 11 determines whether the target print job is equal in copy count to the previously generated reprint job. If the yes path is followed from S314, the CPU 11 proceeds to step S316. In step S316, the CPU 11 adds the page number of the reprint target page acquired in the previous step S302 to the page range of the previously generated reprint job and then proceeds to step S322.

If the no path is followed from step S314, the CPU 11 proceeds to step S318. The CPU 11 generates a reprint job by copying the original print job. In step S320, the CPU 11 completes the generated reprint job by setting the page range of the generated reprint job to the page number of the reprint target page acquired in the previous step S302 and setting the confirmed copy count. It is noted that if the operation in step S314 is performed for the first time, the process is forced to proceed to step S318.

The CPU 11 clears the copy count to zero in step S322 and determines in step S324 whether all the reprint target pages have been acquired. If the no path is followed from step S324, the CPU 11 proceeds to step S308 or if the yes path is followed from S324, the CPU 11 proceeds to step S326.

In step S326, the CPU 11 determines whether the target print job at a page other than at the final page is suspended in the middle. If the no path is followed from step S326, the CPU 11 proceeds to step S330. If the yes path is followed from S326, the CPU 11 proceeds to step S328. In step S328, the CPU 11 generates a print job for a missing page and then proceeds to step S330.

In step S330, the CPU 11 causes the image forming apparatus 50 to perform printing responsive to the reprint job by generating reprint jobs through the process described above and performing the reprint jobs in the order of generation. The CPU 11 thus ends the process.

If the information on the page-based reprint information database 13D is information illustrated in FIG. 10, the pages serving as a reprint target are as follows:

Page 1: cycle numbers 1 and 4,
Page 2: cycle numbers 1 and 3,
Page 4: cycle number 3, and
Page 5: cycle numbers 1 and 4.

The reprint jobs generated in the information processing process may thus be reduced efficiently to a smaller job count as listed as follows:

Reprint job 1→copy count: 2, target pages: 1 and 2,
Reprint job 2→copy count: 1, target page: 4, and
Reprint job 3→copy count: 2, target page: 5.

Figure 13:
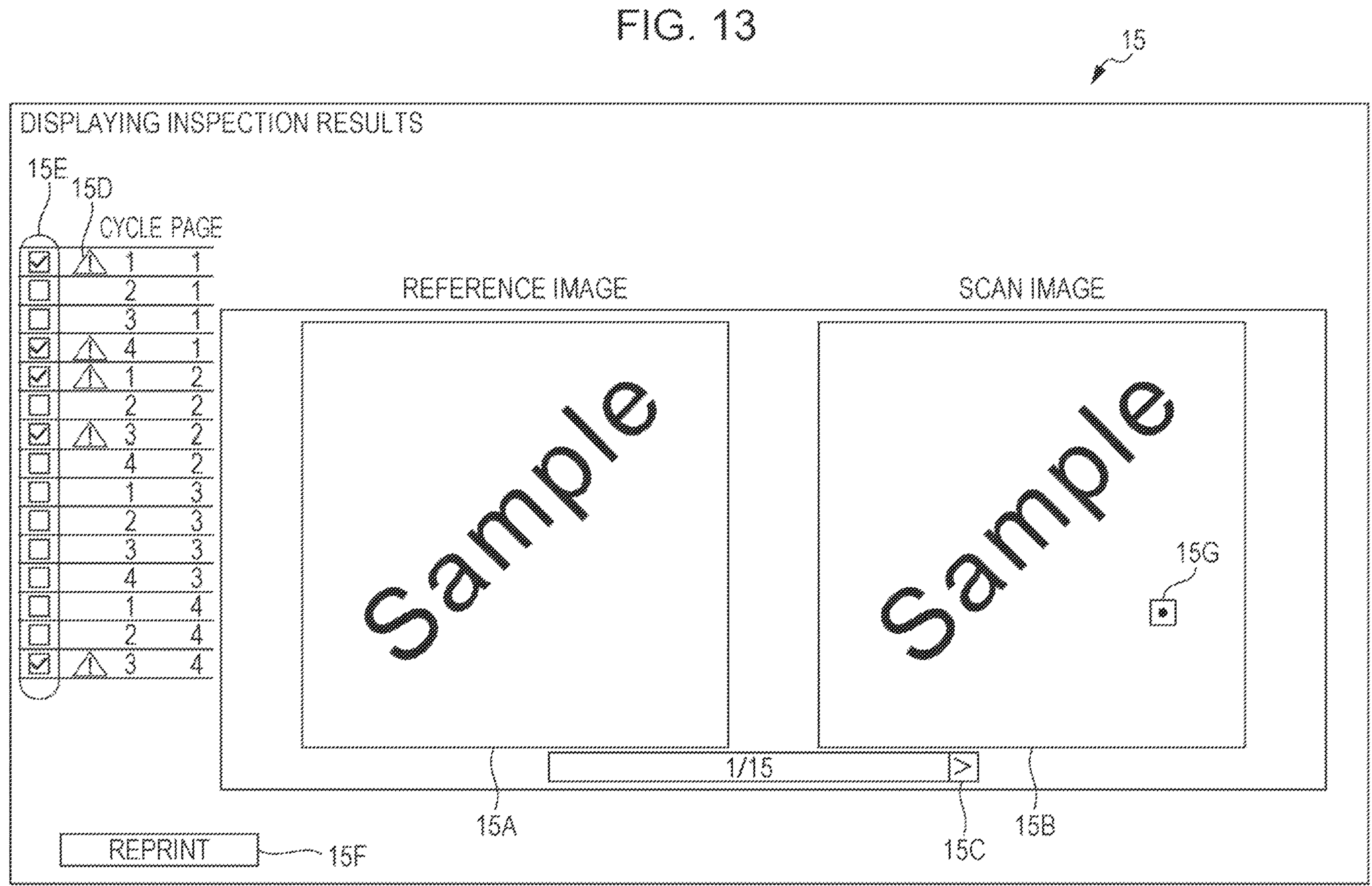
FIG. 13 is a front view illustrating another example of the inspection result display screen according to the second exemplary embodiment of the disclosure.

As an example as illustrated in FIG. 13, if the target print job is suspended in the middle, specifically, the printing is suspended when the cycle number 3 at page number 4 is completed, the reprint jobs generated in the information processing process are efficiently reduced to a smaller number of jobs:

Reprint job 1→copy count: 2, target page numbers: 1, 2, and 4, and

Reprint job 2→copy count: 4, target page: 5.

According to the exemplary embodiments of the disclosure, when the reprint jobs are performed, the setting of the property of the corresponding print job is not modified. The disclosure is not limited to this method. For example, the setting of the property may be modified in the exemplary embodiments.

Since the reprint jobs performed with the setting modified may possibly result in unnecessary printing, the execution of the reprint jobs may be suspended or the modified setting may be notified to the user. The user, if notified of the modified setting, may be notified of the contents of the modified setting. In such an exemplary embodiment, if the setting is modified as the user intends, the reprint job may be performed as is in response to an instruction from the user.

If there is a possibility that the setting of the property of the corresponding print job is modified when the reprinting is performed in response to the reprint job, the setting of the property during printing of the print job may be saved on the storage 13 or the like. In such an exemplary embodiment, when the reprint job is performed with the corresponding setting modified, the reprint job may be performed with the saved setting applied. In this exemplary embodiment, the unnecessary reprinting may be controlled.

According to the exemplary embodiments, the technique disclosed herein is applied to the terminal apparatus 10. The disclosure is not limited to this method. For example, the technique disclosed herein may be applied to the image forming apparatus 50. In such a case, the reprint verification process and information processing process may be performed by the image forming apparatus 50.

According to the exemplary embodiments, the reprint verification process causes the user to confirm whether to perform the reprinting. The disclosure is not limited to this method. For example, if a fault is found in a print product in the operation in step S106 in the reprint verification process, information indicating that the reprinting of the print product having the fault is to be performed may be saved on database without an instruction from the user.

The exemplary embodiments have been described. The scope of the disclosure is not limited to the scope of the exemplary embodiments. A variety of modifications and improvements may be made to the exemplary embodiments without departing from the scope of the disclosure and the modified or improved exemplary embodiments may also fall within the scope of the disclosure.

The exemplary embodiments are not intended to limit the scope defined by the claims and all combinations of features described with reference to the exemplary embodiments are not necessarily required as a solution to the disclosure. The exemplary embodiments include a variety of phases of the disclosure and a combination of multiple elements disclosed may form a variety of the disclosure. Even if a subset is deleted from a set of the elements forming each of the exemplary embodiments, a configuration with the subset deleted may still form the disclosure as long as an advantage results.

In the exemplary embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the embodiments above, and may be changed.

According to the exemplary embodiments, each of the processes is implemented by a software configuration when a computer executes software programs. The disclosure is not limited to this method. For example, each of the processes may be implemented by a hardware configuration or a combination of the software and hardware configurations.

The configuration of the terminal apparatus 10 have been described with reference to the exemplary embodiments and without departing from the scope of the disclosure, an element may be deleted from the terminal apparatus 10 or a new element may be added to the terminal apparatus 10.

The flows of the processes of the exemplary embodiments have been described for exemplary purposes only and without departing from the scope of the disclosure, a step may be deleted from the processes or a new step may be added to the processes.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus including:

a processor configured to:

acquire inspection results on a print product that has been printed in response to multiple print jobs; and generate on each of page groups a reprint job used to print a page indicated as being disqualified by the inspection results, the page group sequentially printed and having an attribute common to the print jobs.

(((2)))

In the information processing apparatus according to (((1))), the processor is configured to acquire the inspection results by comparing a first image of the print product that is obtained by rasterizing the print job with a second image of the print product that is obtained by printing the print job.

(((3)))

In the information processing apparatus according to (((2))), the processor is configured to display the first image and the second image side by side if the second image has a fault.

(((4)))

In the information processing apparatus according to (((3))), the processor is configured to display the second image with a portion of the fault emphasized.

(((5)))

In the information processing apparatus according to (((4))), the processor is configured to:

in response to displaying of the first image and the second image, receive an instruction as to whether to perform reprinting; and if the received instruction instructs the reprinting to be performed, perform the reprint job.

(((6)))

In the information processing apparatus according to one of (((1))) through (((5))), the processor is configured to perform reprinting on a per page group basis if the reprinting is to be performed in response to the reprint job and a pending page of the page group in the print job is difficult to replace.

(((7)))

In the information processing apparatus according to (((6))), a case that the pending page of the page group in the print job is difficult to replace indicates that the print job is a stapling job.

(((8)))

In the information processing apparatus according to one of (((1))) through (((7))), the processor is configured to, if the reprint job is to be performed and a setting for the reprint job is modified, suspend execution of the reprint job or indicate that the setting is modified.

(((9)))

In the information processing apparatus according to one of (((1))) through (((7))), the processor is configured to:

save a setting during execution of the print job; and if the reprint job is to be performed and a setting for the reprint job is modified, perform the reprint job with the saved setting applied.

(((10)))

In the information processing apparatus according to one of (((1))) through (((9))), the processor is configured to set reprint jobs into a single reprint job if no fault occurs in a page order when reprint jobs to be sequentially performed are performed in bulk printing.

(((11)))

In the information processing apparatus according to one of (((1))) through (((10))), the common attribute is a value indicating a cycle number, and the processor is configured to generate a reprint job on each of the page groups having a common cycle number.

(((12)))

In the information processing apparatus according to one of (((1))) through (((10))), the common attribute is a value indicating a page number, and the processor is configured to generate a reprint job on each of the page groups having a common page number.

What is claimed is:

1. An information processing apparatus comprising:

a processor configured to:

acquire inspection results on a print product that has been printed in response to a plurality of print jobs; and determine whether all pages included in the plurality of the print jobs are printed or not;

when the processor determines that all the pages included in the plurality of the print jobs are printed, generate a reprint job only including pages indicated as being disqualified by the inspection results; and when the processor determines that all the pages included in the plurality of the print jobs are not printed, generate the reprint job including pages indicated as being disqualified by the inspection results and pages that are not printed.

2. The information processing apparatus according to claim 1, wherein the processor is configured to acquire the inspection results by comparing a first image of the print product that is obtained by rasterizing the print job with a second image of the print product that is obtained by printing the print job.

3. The information processing apparatus according to claim 2, wherein the processor is configured to display the first image and the second image side by side if the second image has a fault.

4. The information processing apparatus according to claim 3, wherein the processor is configured to display the second image with a portion of the fault emphasized.

5. The information processing apparatus according to claim 4, wherein the processor is configured to:

in response to displaying of the first image and the second image, receive an instruction as to whether to perform reprinting; and if the received instruction instructs the reprinting to be performed, perform the reprint job.

6. The information processing apparatus according to claim 1, wherein the processor is configured to perform reprinting on a per page group basis if the reprinting is to be performed in response to the reprint job and a pending page of the page group in the print job is difficult to replace.

7. The information processing apparatus according to claim 6, wherein a case that the pending page of the page group in the print job is difficult to replace indicates that the print job is a stapling job.

8. The information processing apparatus according to claim 1, wherein the processor is configured to, if the reprint job is to be performed and a setting for the reprint job is modified, suspend execution of the reprint job or indicate that the setting is modified.

9. The information processing apparatus according to claim 1, wherein the processor is configured to:

save a setting during execution of the print job; and if the reprint job is to be performed a setting for the reprint job is modified, perform the reprint job with the saved setting applied.

10. The information processing apparatus according to claim 1, wherein the processor is configured to set reprint jobs into a single reprint job if no fault occurs in a page order when reprint jobs to be sequentially performed are performed in bulk printing.

11. The information processing apparatus according to claim 1, wherein the processor is further configured to:

determine, based on a cycle number, page groups each including pages printed at an identical copy sequence position across the plurality of print jobs; and generate the reprint job for each of the page groups.

12. The information processing apparatus according to claim 1, wherein the processor is further configured to:

determine, based on a page number, page groups each including pages corresponding to an identical page position across the plurality of print jobs; and generate the reprint job for each of the page groups.

13. An information processing apparatus comprising:

means for acquiring inspection results on a print product that has been printed in response to a plurality of print jobs; and means for determining whether all pages included in the plurality of the print jobs are printed or not;

means for, when it is determined that all the pages included in the plurality of the print jobs are printed, generating a reprint job only including pages indicated as being disqualified by the inspection results; and means for, when determined that all the pages included in the plurality of the print jobs are not printed, generating the reprint job including pages indicated as being disqualified by the inspection results and pages that are not printed.

14. A non-transitory computer readable medium storing a program causing a computer to execute a process for processing information, the process comprising:

acquiring inspection results on a print product that has been printed in response to a plurality of print jobs; and determining whether all pages included in the plurality of the print jobs are printed or not;

when it is determined that all the pages included in the plurality of the print jobs are printed, generating a reprint job only including pages indicated as being disqualified by the inspection results; and when it is determined that all the pages included in the plurality of the print jobs are not printed, generating the reprint job including pages indicated as being disqualified by the inspection results and pages that are not printed.

* * * * *